(12) United States Patent
Suzuki et al.

(10) Patent No.: US 6,378,171 B1
(45) Date of Patent: Apr. 30, 2002

(54) TILTING HINGE

(75) Inventors: Naokazu Suzuki; Isao Nagashima; Oriya Fujita, all of Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 0 days.

(21) Appl. No.: 09/512,523

(22) Filed: Feb. 24, 2000

(30) Foreign Application Priority Data

Feb. 26, 1999 (JP) ............................................ 11-051949

(51) Int. Cl.$^7$ .............................................. E05D 11/04
(52) U.S. Cl. ......................................... 16/342; 361/681
(58) Field of Search ........................ 16/342, 273, 340, 16/337, 386; 361/681, 680; 403/119, 120, 111, 104, 84

(56) References Cited

U.S. PATENT DOCUMENTS

| | | | | |
|---|---|---|---|---|
| 4,379,360 A | * | 4/1983 | Papsdorf ...................... | 16/337 |
| 4,620,344 A | * | 11/1986 | Lewis, Jr. ..................... | 16/337 |
| 5,826,307 A | * | 10/1998 | Chin-Fu ........................ | 16/340 |
| 5,894,635 A | * | 4/1999 | Lu ................................ | 16/342 |
| 5,937,482 A | * | 8/1999 | Horng ........................... | 16/340 |
| 5,940,936 A | * | 8/1999 | Lu ................................ | 16/337 |
| 5,970,580 A | * | 10/1999 | Katoh ........................... | 16/337 |
| 6,070,494 A | * | 6/2000 | Horng ........................... | 16/342 |
| 6,081,969 A | * | 7/2000 | Tanahashi et al. ............ | 16/337 |
| 6,085,388 A | * | 7/2000 | Kaneko ......................... | 16/342 |
| 6,171,011 B1 | * | 1/2001 | Wu ................................ | 16/342 |

* cited by examiner

*Primary Examiner*—Lynne H. Browne
*Assistant Examiner*—Doug Hutton
(74) *Attorney, Agent, or Firm*—Notaro & Michalos P.C.

(57) ABSTRACT

A tilting hinge is provided which includes a first bracket consisting of a fixing plate portion and a bearing plate portion bent at a right angle relative to the fixing plate portion, the fixing plate portion being fixed to any one of the body of an apparatus and a component part of the apparatus, installed pivotably to the latter and the bearing plate portion having a non-circular bearing hole formed therein; a cylinder having a fixing portion formed at one end and a friction torque generating hole formed axially in it, the fixing end portion being inserted and fixed in the non-circular bearing hole in the bearing plate portion of the first bracket; a second bracket consisting of a fixing plate portion and a bearing plate portion bent at a right angle relative to the fixing plate portion, the fixing plate portion being fixed to the other of the body and component part of the apparatus and the bearing plate portion having formed in it a non-circular bearing hole; and a radially elastic spring pin having provided at one end a fixing end portion inserted and fixed in the non-circular bearing hole in the bearing plate portion of the second bracket; the spring pin being press-fitted at the free end into the friction torque generating hole in the cylinder to be rotatable with a friction with the outer surface of the cylinder and the wall surface of the friction torque generating hole.

7 Claims, 15 Drawing Sheets

TILTING HINGE

BACKGROUND OF THE INVENTION

1. Field of the Invention

The present invention relates to a hinge, and more particularly to a tilting hinge suitably usable for supporting a component part, such as a display panel, of a small office-automation apparatus, such as a notebook computer, pivotably on a stationary structure of the apparatus, such as a keyboard or body of the notebook computer.

2. Description of the Prior Art

In a typical one of the conventional tilting hinges of this type, a flange is provided on a shaft fixed to a first bracket to be fixed to the body, such as a keyboard, of an apparatus, such as a notebook computer, a second bracket to be fixed to a component part, such as a display panel, of the apparatus is born rotatably born on the shaft, a disc-like friction washer is provided between the second bracket and the flange of the shaft or at either side of the second bracket, the friction washer having formed in the center thereof a through-hole in which the shaft is inserted, a disc-like spring washer is provided abutting the friction washer, the spring washer having formed in the center thereof a through-hole in which the shaft is also inserted, and the end of the shaft is riveted or fastened with a nut to press the spring washer and friction washer to each other. When the second bracket is rotated, a friction torque is generated between the friction washer and spring washer.

Recently, the office-automation apparatuses, more particularly, the portable personal computers such as a notebook computer, laptop computer, etc., have been designed more and more compact and thinner. Therefore, the tilting hinges used with such compact personal computers should be correspondingly compact and able to create a high friction torque.

For the conventional tilting torque to work with such a high friction, it is necessary to use washers having a larger diameter, which however will not meet the requirements for the portable computers to have an increased compactness and decreased thickness. Otherwise, it is necessary to use more than one friction washer and spring washer in pair or to increase the caulking torque or nut tightening torque. However, the former case will lead to an increased number of parts of the tilting hinge. Thus, the manufacturing cost for the tilting hinge will be higher. The latter case will lead to an easy abrasion of the friction and spring washers of the tilting hinge. Namely, the durability of the tilting hinge will be lower.

Also, in the conventional tilting hinges, a lubricant is used between the friction and spring washers. Because of the construction of the conventional tilting hinge, the lubricant is likely to leak from the outer edges of the washers and stick to the hand of an installer of an office-automation apparatus during assembling of the apparatus. The lubricant will thus stain the apparatus.

OBJECTS AND SUMMARY OF THE INVENTION

Therefore, the present invention has an object to overcome the above-mentioned drawbacks of the prior art by providing a compact, small operating-radius, simply constructed tilting hinge able to work with a high friction torque.

According to the present invention, there is provided a tilting hinge including:

a first bracket consisting of a fixing plate portion and a bearing plate portion bent at a right angle relative to the fixing plate portion, the fixing plate portion being fixed to the body of an apparatus or a component part installed pivotably to the apparatus body, and the bearing plate portion having a non-circular bearing hole formed therein;

a cylindrical member having a fixing portion formed at one end thereof and a friction torque generating through-hole formed axially therein, the fixing end portion being inserted and fixed in the non-circular bearing hole in the bearing plate portion of the first bracket;

a second bracket consisting of a fixing plate portion and a bearing plate portion bent at a right angle relative to the fixing plate portion, the fixing plate portion being fixed to the pivotable component part or apparatus body and the bearing plate portion having a non-circular bearing hole formed therein; and a radially-elastic spring pin having provided at one end thereof a fixing end portion which is inserted and fixed in the non-circular bearing hole in the bearing plate portion of the second bracket;

the spring pin being press-fitted first at the free end thereof into the friction torque generating hole in the cylinder from the cylinder end fixed to the second bracket, to be rotatable with a friction with the wall surface of the friction torque generating hole in the cylinder.

According to the present invention, there is also provided a tilting hinge including:

a first bracket consisting of a fixing plate portion and a bearing plate portion bent at a right angle relative to the fixing plate portion, the bearing plate portion having a non-circular bearing hole formed therein and being fixed to the body of an apparatus or a component part installed pivotably to the apparatus body;

a tubular cylindrical member inserted and fixed at one end thereof in the non-circular bearing hole in the bearing plate portion of the first bracket and having formed axially therein a friction torque generating bore;

a second bracket consisting of a fixing plate portion and a bearing plate portion bent at a right angle relative to the fixing plate portion, the bearing plate portion having a non-circular bearing hole formed therein and being fixed to the pivotable component part or apparatus body; and a radially-elastic spring pin fixed at one end thereof in the non-circular bearing hole in the bearing plate portion of the second bracket;

the spring pin being press-fitted first at the free end thereof from the free end of the cylinder into the friction torque generating bore to be rotatable with a friction with the wall surface of the friction torque generating bore in the cylinder.

According to the present invention, there is further provided a tilting hinge including:

a first bracket consisting of a fixing plate portion and a bearing plate portion bent at a right angle relative to the fixing plate portion, the bearing plate portion having a non-circular bearing hole formed therein and being fixed to the body of an apparatus or a component part installed pivotably to the apparatus body;

a tubular cylindrical member inserted and fixed at one end thereof in the non-circular bearing hole in the bearing plate portion of the first bracket and having formed axially therein a friction torque generating bore;

a second bracket consisting of a fixing plate portion and a bearing plate portion bent at a right angle relative to the fixing plate portion, the bearing plate portion having a non-circular bearing hole formed therein and being fixed to the component part or apparatus body; and a radially-elastic spring pin fixed at one end thereof in the non-circular bearing hole in the bearing plate portion of the second bracket;

the spring pin being press-fitted first at the free end thereof from the free end of the cylinder into the friction torque generating bore in the cylinder to be rotatable with a friction with the wall surface of the friction torque generating bore, and a stopper means being provided between the cylindrical member and the first bracket.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
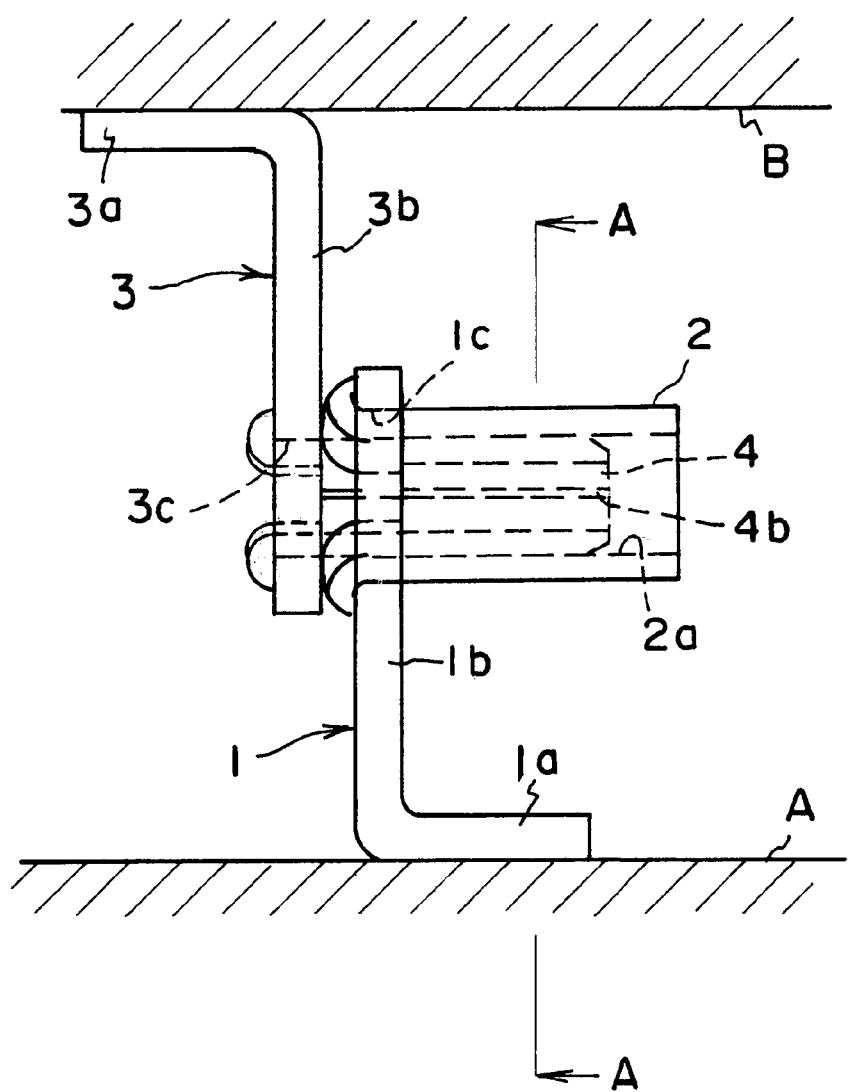
FIG. 1 is a front view of a first embodiment of the tilting hinge according to the present invention.
Figure 2:
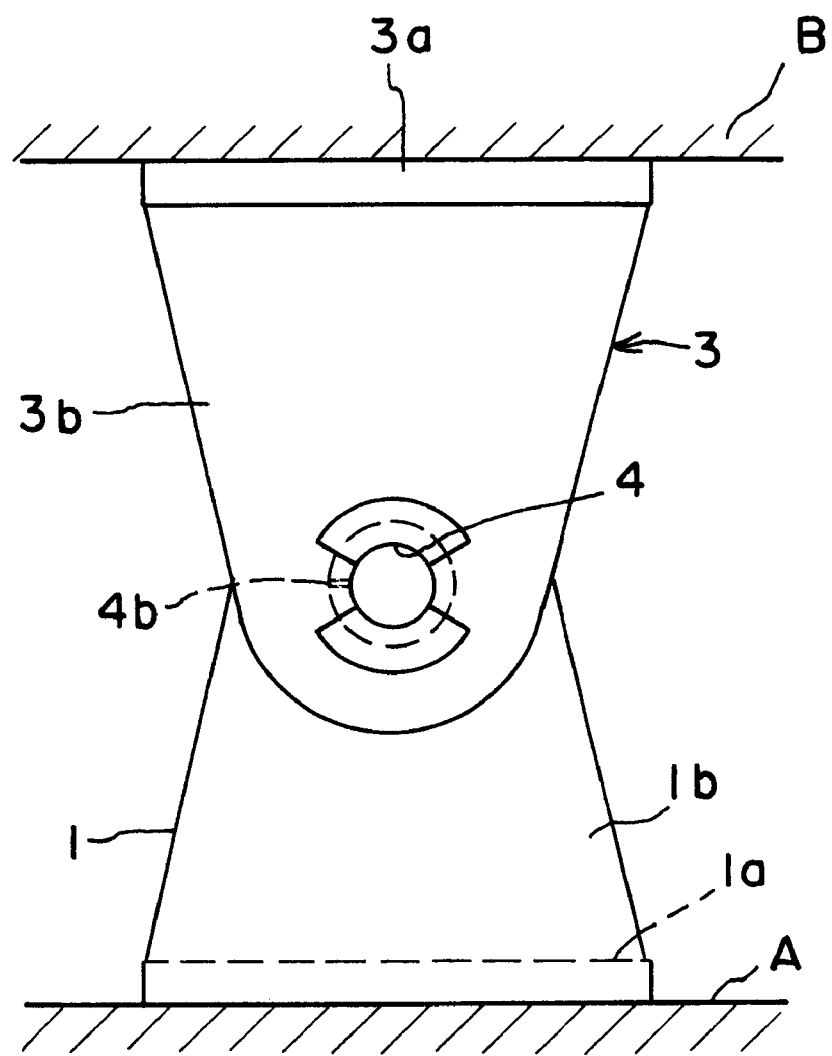
FIG. 2 is a left side elevation of the tilting hinge in FIG. 1.
Figure 3:
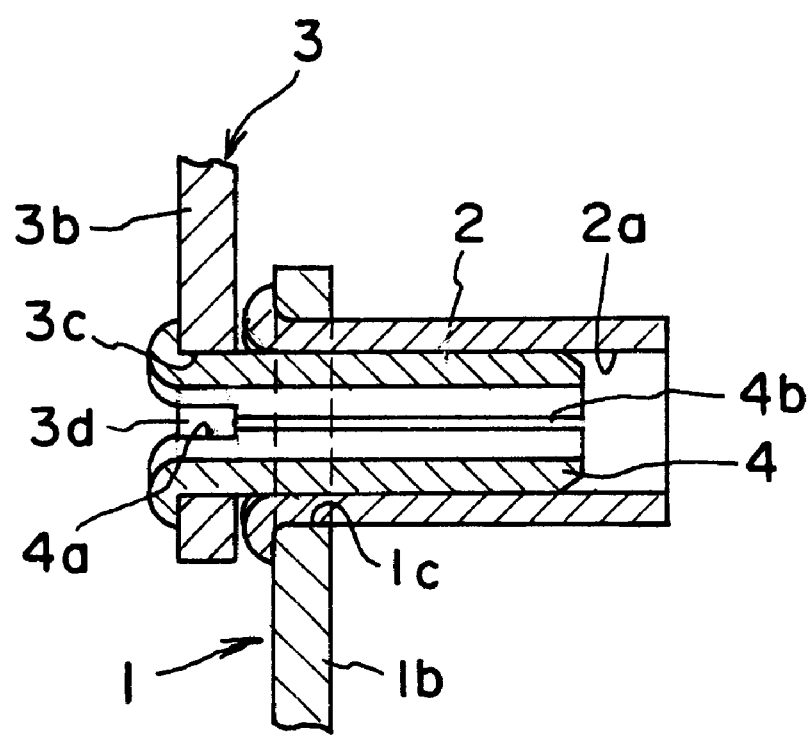
FIG. 3 is an axial sectional view of the tilting hinge in FIG. 1.
Figure 4:
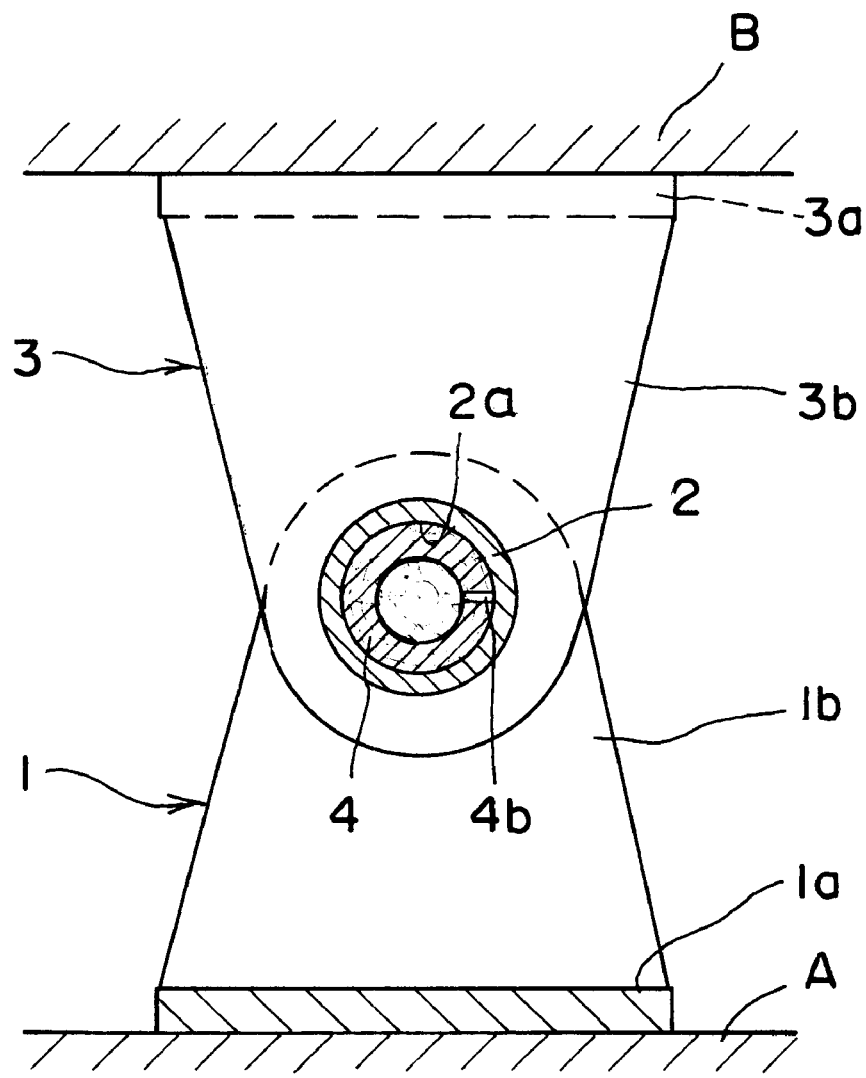
FIG. 4 is a sectional view of the tilting hinge, taken along the line A—A in FIG. 1.
Figure 5:
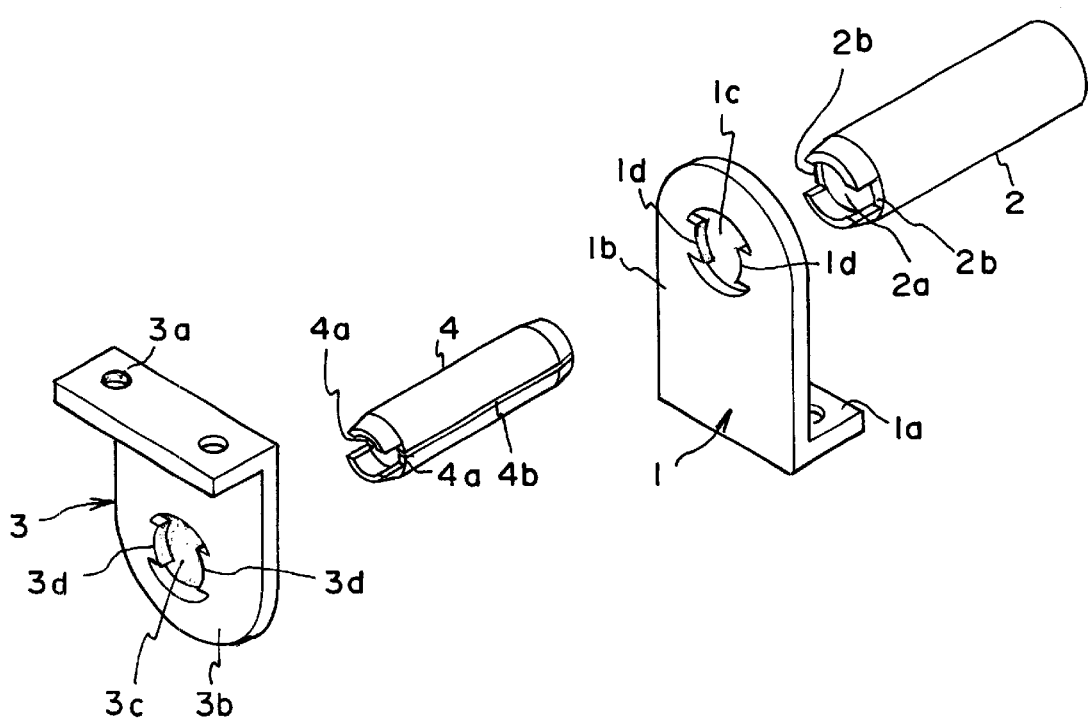
FIG. 5 is an exploded perspective view of the tilting hinge in FIG. 1, with the spring pin being turned 180 deg.
Figure 6:
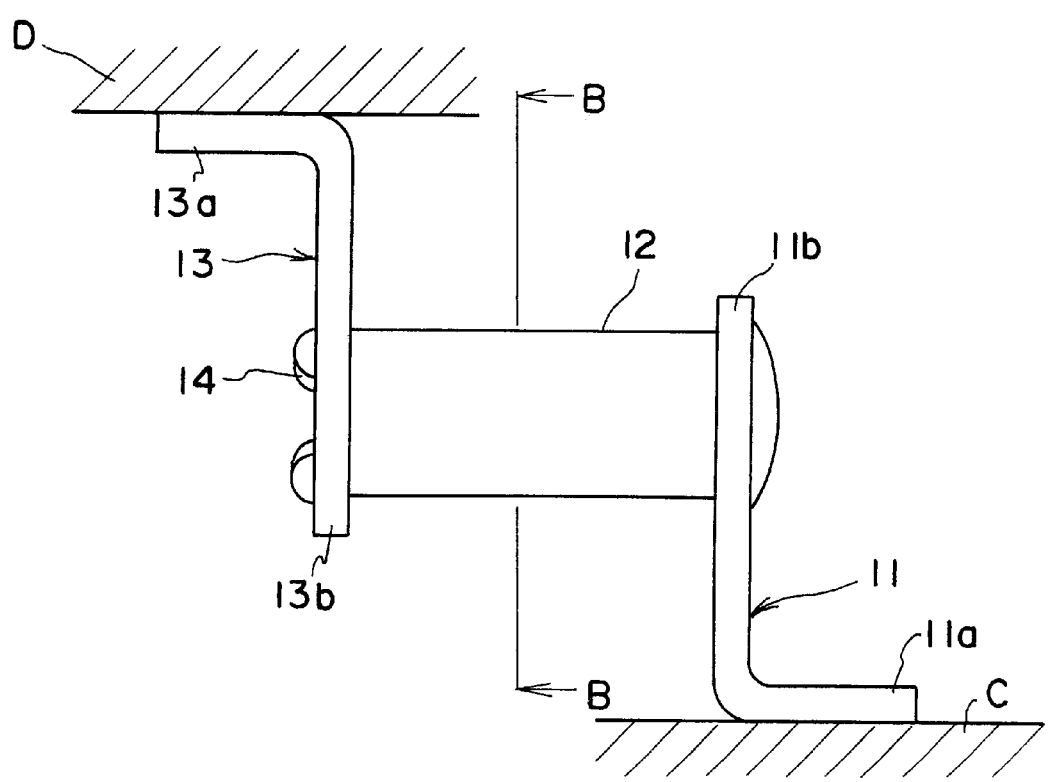
FIG. 6 is a front view of a second embodiment of the tilting hinge according to the present invention.
Figure 7:
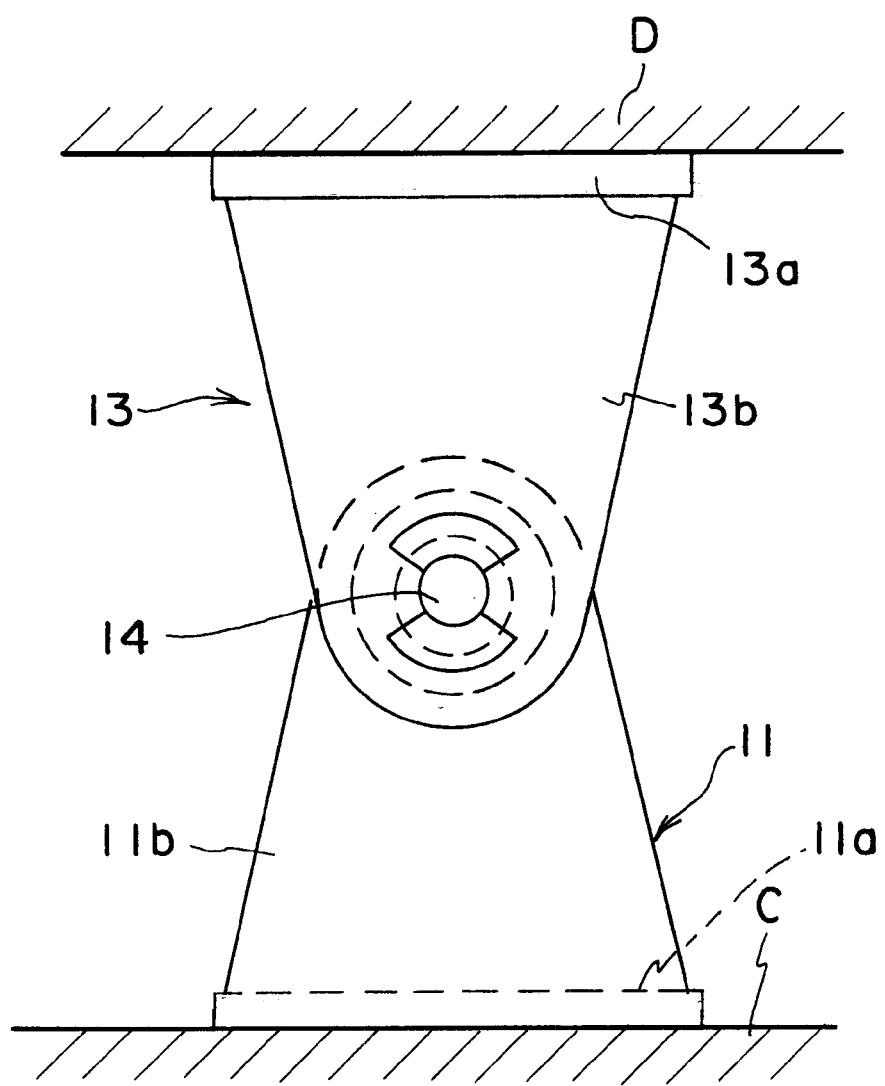
FIG. 7 is a left side elevation of the tilting hinge in FIG. 6.
Figure 8:
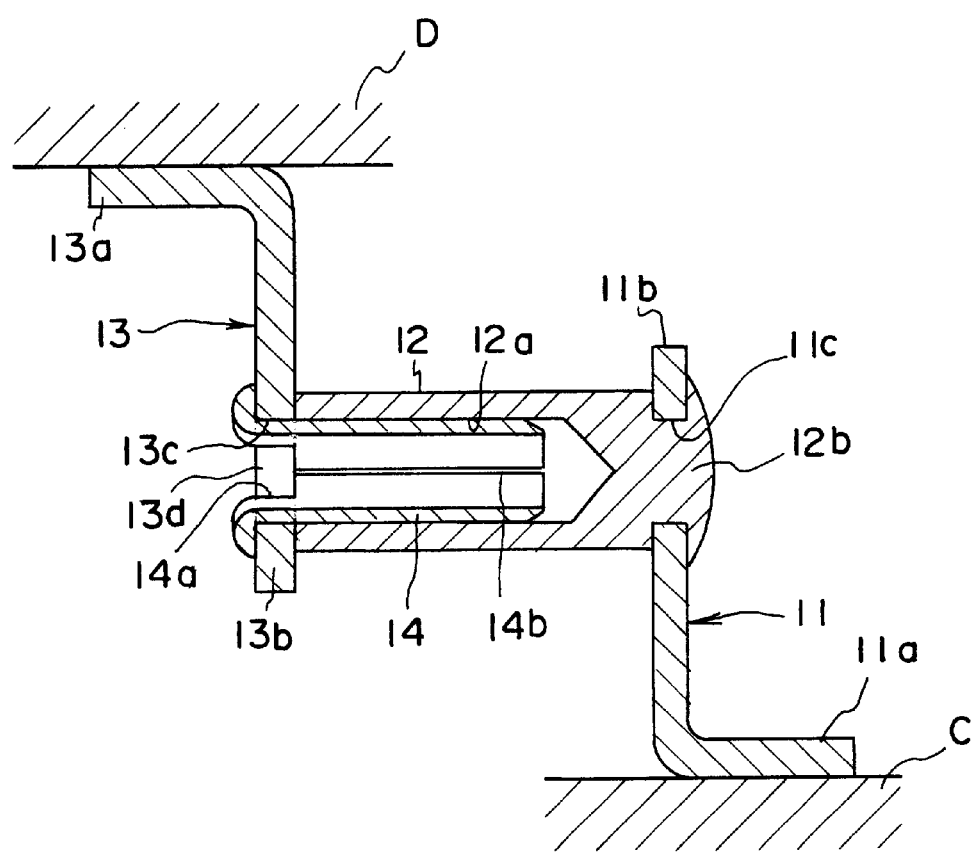
FIG. 8 is an axial sectional view of the tilting hinge in FIG. 6.
Figure 9:
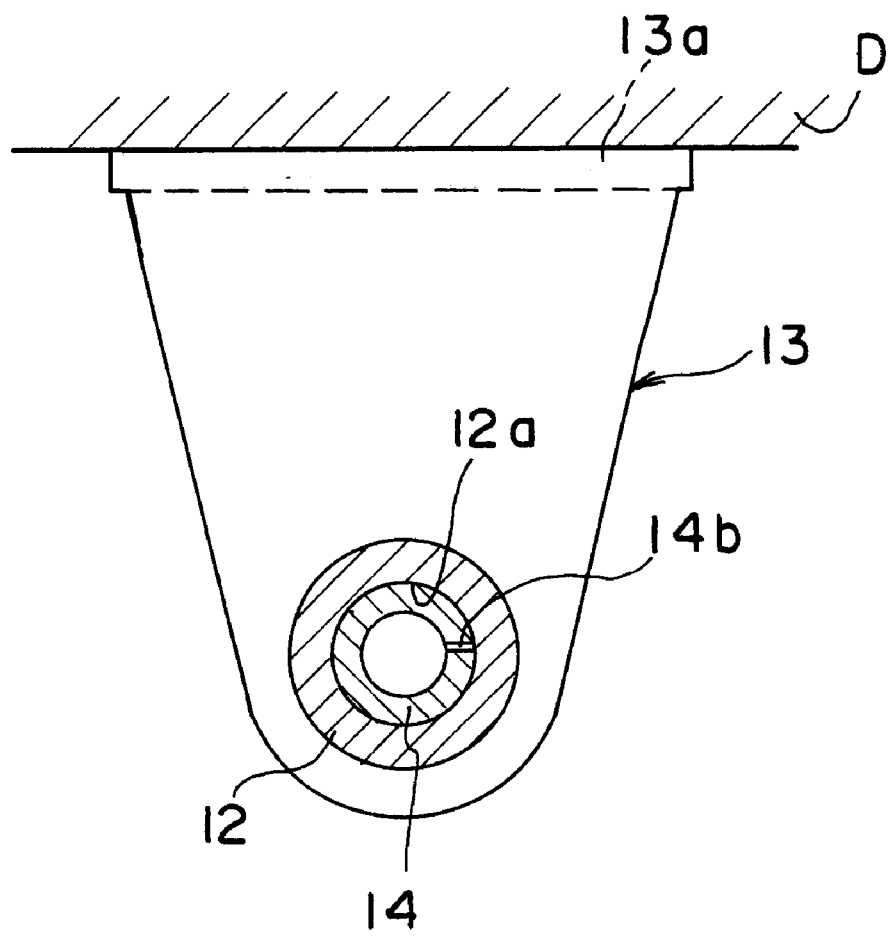
FIG. 9 is a sectional view of the tilting hinge, taken along the line A—A in FIG. 6.

Referring now to FIGS. 1 to 5, there is schematically illustrated the first embodiment of the tilting hinge according to the present invention. As shown, the tilting hinge according to the first embodiment of the present invention includes a first bracket 1 having a generally L-shaped section. The first bracket 1 consists of a fixing plate portion 1a and a bearing plate portion 1b bent at a right angle relative to the fixing plate portion 1a. The first bracket 1 is fixed at the fixing plate portion 1a thereof to the body, such as a keyboard, of a notebook computer, for example. The keyboard is indicated with a reference A. The bearing plate portion 1b has formed therein a non-circular bearing hole 1c. The tilting hinge includes also a tubular cylinder 2 having a friction torque generating hole 2a formed through it. To fix the tubular cylinder 2 non-rotatably to the first bracket 1, the tubular cylinder 2 is inserted at one end thereof into the non-circular bearing hole 1c of the bearing plate portion 1b until it will not go any more and the one end portion of the tubular cylinder 2 projected out of the non-circular bearing hole 1c is riveted to the opposite side of the bearing plate portion 1b to the tubular cylinder 2. As best shown in FIG. 5, the non-circular bearing hole 1c formed in the bearing plate portion 1b of the first bracket 1 has two projections 1d extending radially from the hole wall. Namely, the two radial projections 1d make the bearing hole 1c non-circular. Further, the tubular cylinder 2 has two cuts 2b formed at the one end portion thereof.

To fix the end portion of the tubular cylinder 2 to the bearing plate portion 1b of the first bracket 1, the end portion of the tubular cylinder 2 is inserted into the non-circular bearing hole 1c until the two radial projections 1d are engaged in the two cuts 2b, respectively, and then the end portion projected out of the bearing hole 1c is riveted. Thus, the one end of the tubular cylinder 2 is fixed non-rotatably to the first bracket 1 and will not come out axially from the first bracket 1.

The projections 1d have a thickness selected to be equal to or somewhat smaller than the wall thickness of the tubular cylinder 2. So, the end faces of the projections 1d will not project into the friction torque generating hole 2a of the cylinder 2.

The tilting hinge includes also a second bracket 3 having a generally L-shaped section. The second bracket 3 consists of a fixing plate portion 3a and a bearing plate portion 3b bent at a right angle relative to the fixing plate portion 3a. The second bracket 3 is fixed at the fixing plate portion 3a thereof to a component part, such as a display panel, of the notebook computer. The display panel is indicated with a reference B. The bearing plate portion 3b has formed therein a non-circular bearing hole 3c. The tilting hinge includes also a tubular spring pin 4. To fix the tubular spring pin 4 non-rotatably to the second bracket 3, the tubular spring pin 4 is inserted at one end thereof into the non-circular bearing hole 3c of the bearing plate portion 3b until it will not go any more and the one end portion of the spring pin 4 projected out of the non-circular bearing hole 3c is riveted to the opposite side of the bearing plate portion 3b to the spring pin 4. As best shown in FIG. 5, the non-circular bearing hole 3c formed in the bearing plate portion 3b of the second bracket 3 has two projections 3d extending radially from the hole wall. Namely, the two radial projections 3d make the bearing hole 3c non-circular. Further, the tubular spring pin 4 has two cuts 4a formed at the one end portion thereof.

To fix the end portion of the tubular spring pin 4 to the bearing plate portion 3b of the second bracket 3, the end portion of the tubular spring pin 4 is inserted into the non-circular bearing hole 3c until the two radial projections 3d are engaged in the two cuts 4a, respectively, and then the end portion projected out of the bearing hole 3c is riveted. Thus, the one end of the tubular spring pin 4 is fixed non-rotatably to the second bracket 3.

The spring pin 4 has also an expanding slot 4b formed therein axially from one of the cuts 4a. So, when the spring pin 4 is tempered, it is made so elastic as to be shrinkable and expansible circumferentially. Namely, the spring pin 4 is radially elastic.

As shown in FIG. 5, the spring pin 4 is press-fitted from the opposite side of the first bracket 1 to the tubular cylinder 2 into the friction torque generating hole 2a of the tubular cylinder 2 through the non-circular bearing hole 1c. When the second bracket 3 is rotated, there will take place a rolling friction between the outer surface of the spring pin 4 and the wall surface of the friction torque generating hole 2a of the cylinder 4 to generate a friction torque. A lubricant (not shown) such as SUMI-COAT (registered trademark) is provided between the outer surface of the spring pin 4 and the wall surface of the friction torque generating hole 2a of the cylinder 2. To retain the lubricant, a concavity or hole (not shown) may be formed in any one or both of the outer surface of the spring pin 4 and wall surface of the friction torque generating hole 2a of the cylinder 2.

Referring now to FIGS. 6 to 10, there is schematically illustrated the second embodiment of the tilting hinge according to the present invention. As shown, the tilting hinge according to the second embodiment of the present invention includes a first bracket 11 having a generally L-shaped section. The first bracket 11 consists of a fixing plate portion 11a and a bearing plate portion 11b bent at a right angle relative to the fixing plate portion 11a. The first bracket 11 is fixed at the fixing plate portion 11a thereof to the body, such as a keyboard, of a notebook computer, for example. The keyboard is indicated with a reference C. The bearing plate portion 11b has formed therein a non-circular bearing hole 11c. The tilting hinge includes also a cylinder 12 having axially formed therein a friction torque generating bore 12a open at one end thereof and closed at the other end. To fix the cylinder 2 non-rotatably to the first bracket 11, the cylinder 12 is inserted at the closed end thereof into the non-circular bearing hole 11c of the bearing plate portion 11b until it will not go any more and one end portion 12b of the cylinder 12 projected out of the non-circular bearing hole 11c is riveted to the opposite side of the bearing plate portion 11b to the cylinder 12.

The tilting hinge includes also a second bracket 13 having a generally L-shaped section. The second bracket 13 consists of a fixing plate portion 13a and a bearing plate portion 13b bent at a right angle relative to the fixing plate portion 13a. The second bracket 13 is fixed at the fixing plate portion 13a thereof to a component part, such as a display panel, of the notebook computer. The display panel is indicated with a reference D. The bearing plate portion 13b has formed therein a non-circular bearing hole 13c. The tilting hinge includes also a tubular spring pin 14. To fix the tubular spring pin 14 non-rotatably to the second bracket 13, the tubular spring pin 14 is inserted at one end thereof into the non-circular bearing hole 13c of the bearing plate portion 13b until it will not go any more and the one end portion of the spring pin 14 projected out of the non-circular bearing hole 13c is caulked to the opposite side of the bearing plate portion 13b to the spring pin 14.

Figure 10:
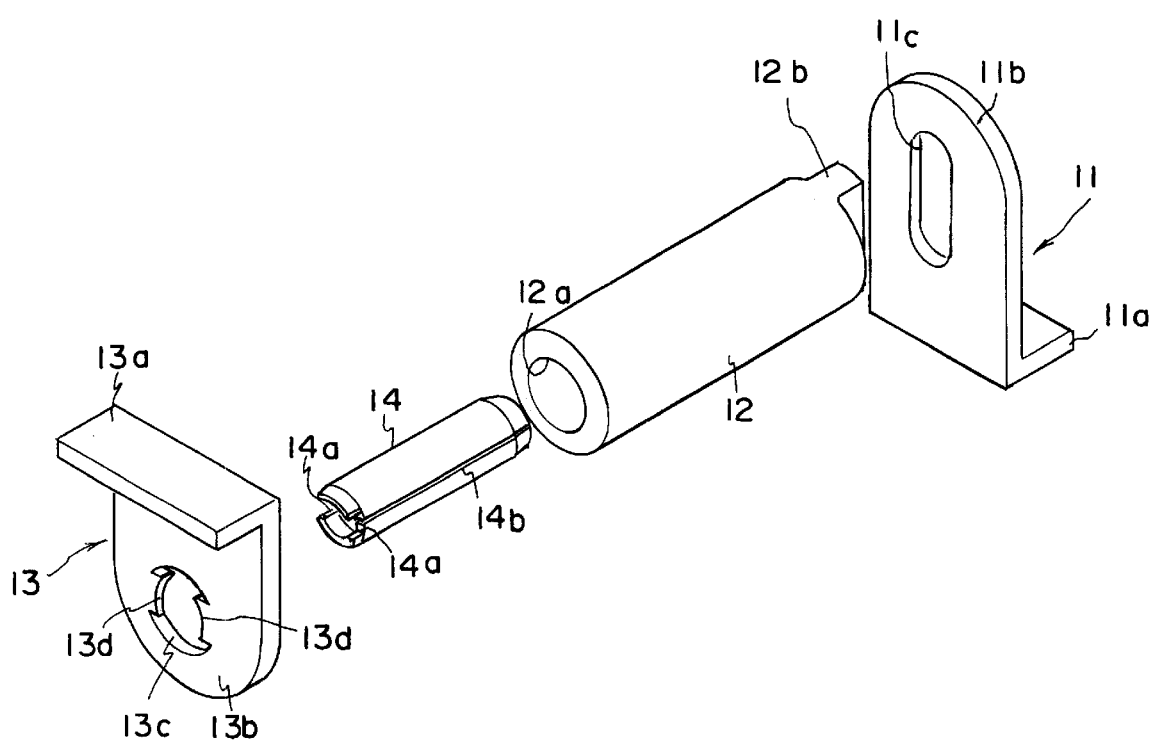
FIG. 10 is an exploded perspective view of the tilting hinge in FIG. 6, with the spring pin being turned 180 deg.
Figure 11:
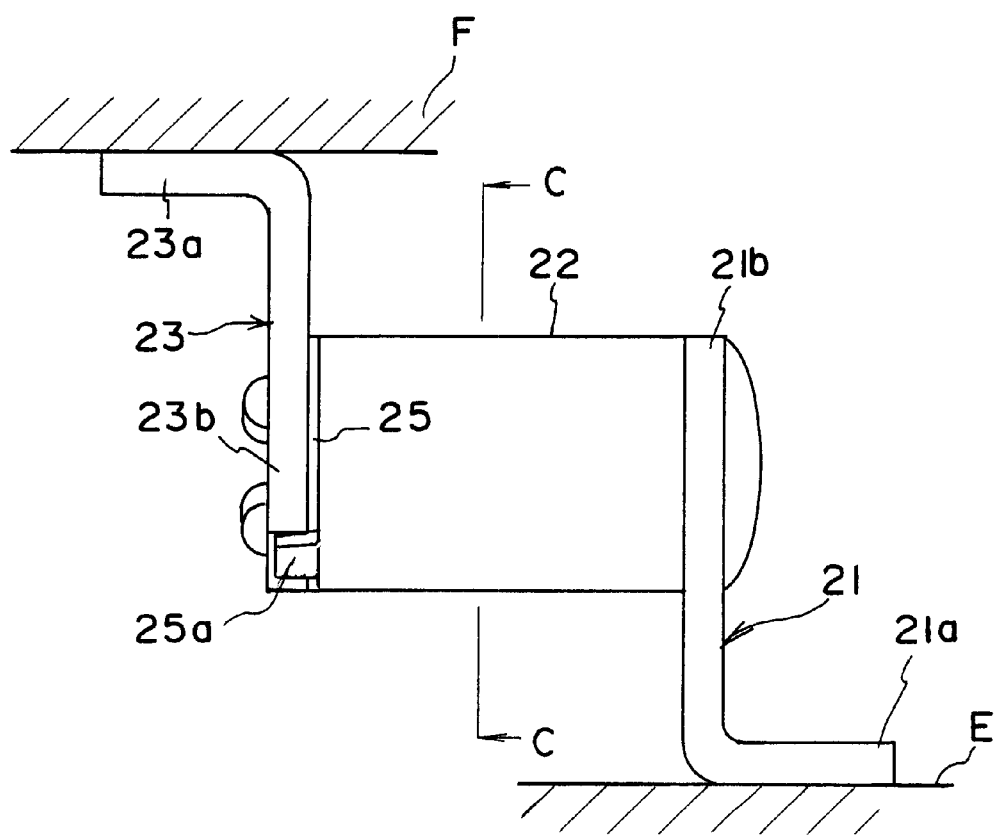
FIG. 11 is a front view of a third embodiment of the tilting hinge according to the present invention.
Figure 12:
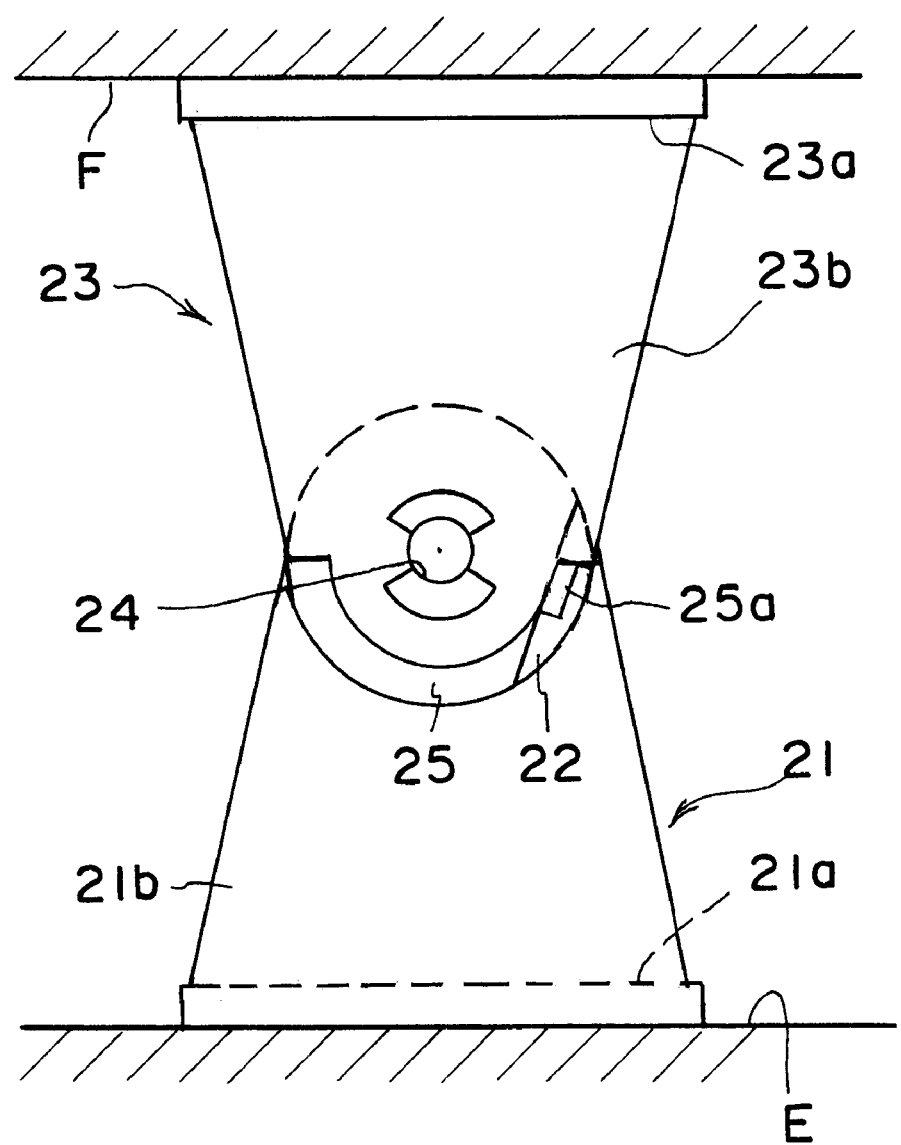
FIG. 12 is a left side elevation of the tilting hinge in FIG. 11.
Figure 13:
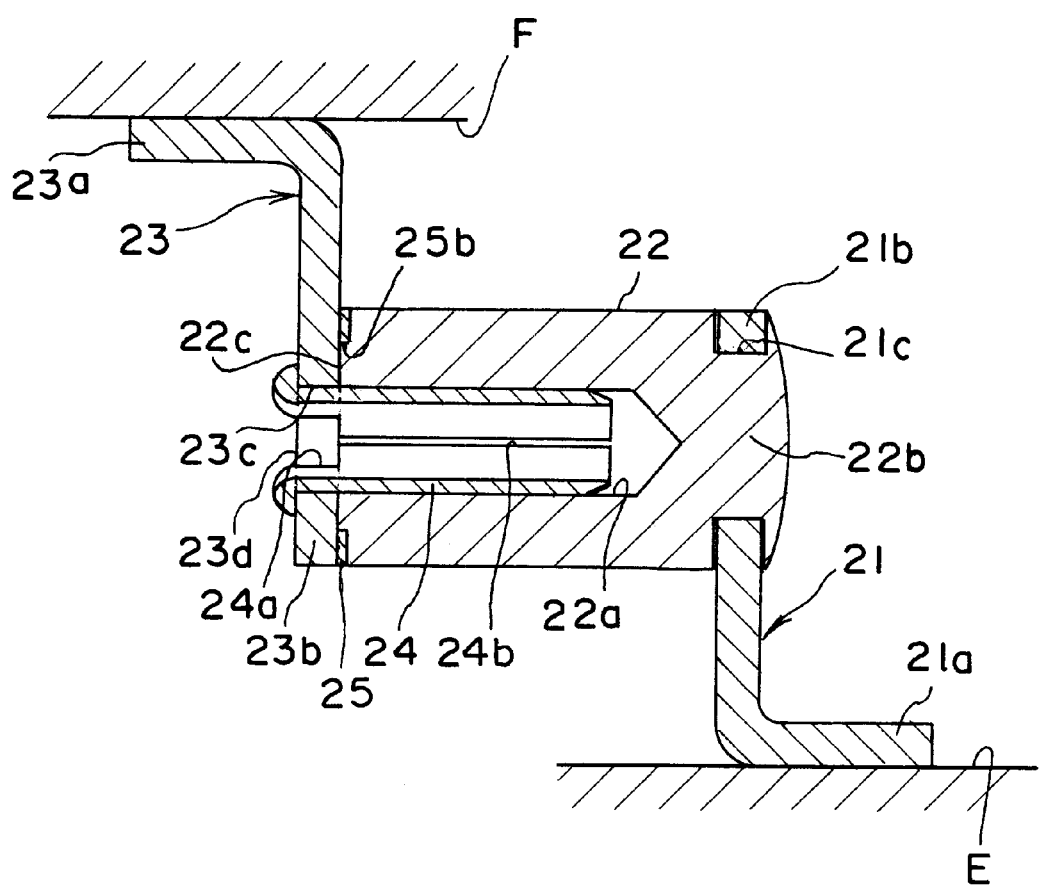
FIG. 13 is an axial sectional view of the tilting hinge in FIG. 11.
Figure 14:
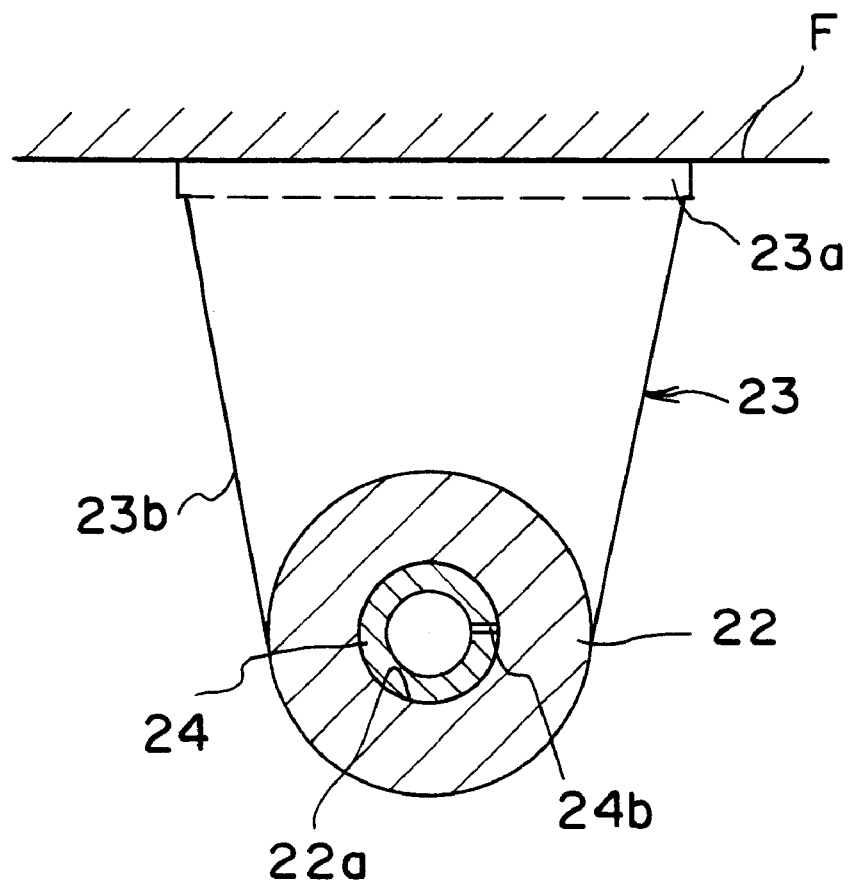
FIG. 14 is a sectional view of the tilting hinge, taken along the line A—A in FIG. 11.

As best shown in FIG. 10, the non-circular bearing hole 13c formed in the bearing plate 13b of the second bracket 13 has two projections 13d extending radially from the hole wall. Namely, the two radial projections 13d make the bearing hole 13c non-circular. Further, the tubular spring pin 14 has two cuts 14a formed at the one end thereof.

To fix the end portion of the tubular spring pin 14 to the bearing plate portion 13b of the second bracket 13, the end portion of the tubular spring pin 14 is inserted into the non-circular bearing hole 13c until the two radial projections 13d are engaged in the two cuts 14a, respectively, and then the end portion projected out of the bearing hole 13c is riveted. Thus, the one end of the tubular spring pin 14 is fixed non-rotatably to the second bracket 13.

The spring pin 14 has also an expanding slot 14b formed therein axially from one of the cuts 14a. So, when the spring pin 14 is tempered, it is made so elastic as to be shrinkable and expansible circumferentially. Thus, the spring pin 14 is radially elastic.

As shown in FIG. 10, the spring pin 14 is press-fitted from the free end of the friction torque generating bore 12a of the tubular cylinder 12 into the friction torque generating bore 12a. When the second bracket 13 is rotated, there will take place a rolling friction between the outer surface of the spring pin 14 and the wall surface of the friction torque generating bore 12a of the cylinder 12 to generate a friction torque. A lubricant (not shown) such as SUMI-COAT (registered trademark) is provided between the outer surface of the spring pin 14 and the wall surface of the friction torque generating bore 12a of the cylinder 12. To retain the lubricant, a concavity or hole (not shown) may be formed in any one or both of the outer surface of the spring pin 14 and wall surface of the friction torque generating bore 12a of the cylinder 12.

Referring now to FIGS. 11 to 15, there is schematically illustrated the third embodiment of the tilting hinge according to the present invention. As shown, the tilting hinge according to the third embodiment of the present invention includes a first bracket 21 having a generally L-shaped section. The first bracket 21 consists of a fixing plate portion 21a and a bearing plate portion 21b bent at a right angle relative to the fixing plate portion 21a. The first bracket 21 is fixed at the fixing plate portion 21a thereof to the body, such as a keyboard, of a notebook computer, for example. The keyboard is indicated with a reference E. The bearing plate portion 21b has formed therein a non-circular bearing hole 21c. The tilting hinge includes also a cylinder 22 having formed axially therein a friction torque generating bore 22a open at one end thereof and closed at the other end. The cylinder 22 has a projection 22b formed at the other end thereof and which has a non-circular section, and also a projection 22c formed at the one end and which has a non-circular section. To fix the cylinder 22 non-rotatably to the first bracket 21, the non-round projection 22b thereof is inserted into the non-circular bearing hole 21c of the first bracket 21 and riveted at the opposite side the first bracket 21 to the cylinder 22. The tilting hinge includes also a stop plate 25 having a projection 25a and a non-circular fixing hole 25b formed therein. The non-round projection 22c is fitted in the non-circular fixing hole 25b of the stop plate 25.

Figure 15:
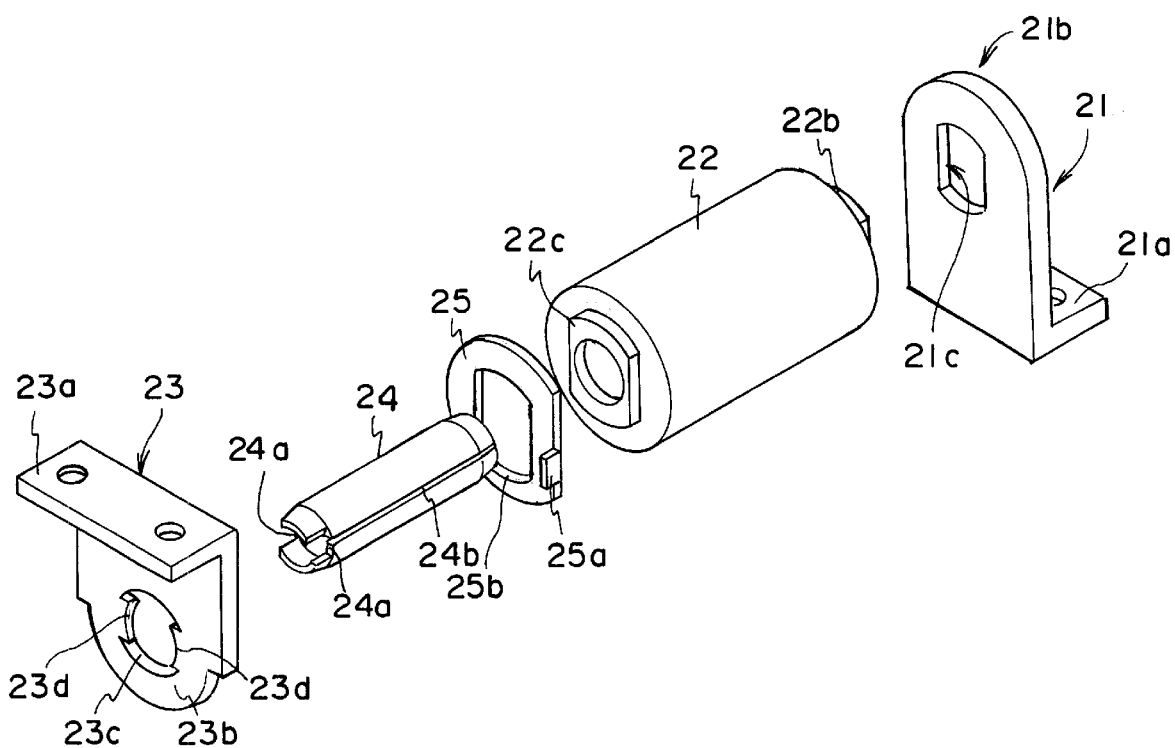
FIG. 15 is an exploded perspective view of the tilting hinge in FIG. 11, with the spring pin being turned 180 deg.

The tilting hinge includes also a second bracket 23 having a generally L-shaped section. The second bracket 23 consists of a fixing plate portion 23a and a bearing plate portion 23b bent at a right angle relative to the fixing plate portion 23a. The second bracket 23 is fixed at the fixing plate portion 23a thereof to a component part, such as a display panel, of the notebook computer. The display panel is indicated with a reference F. The bearing plate portion 23b has formed therein a non-circular bearing hole 23c. The tilting hinge includes also a tubular spring pin 24. To fix the tubular spring pin 24 non-rotatably to the second bracket 23, the tubular spring pin 24 is inserted at one end thereof into the non-circular bearing hole 23c of the bearing plate portion 23b until it will not go any more and the one end portion of the spring pin 24 projected out of the non-circular bearing hole 23c is riveted to the opposite side of the bearing plate portion 23b to the spring pin 24. As best shown in FIG. 15, the non-circular bearing hole 23c formed in the bearing plate 23b of the second bracket 23 has two projections 23d extending radially from the hole wall. Namely, the two radial projections 23d make the bearing hole 23c non-circular. Further, the tubular spring pin 24 has two cuts 24a formed at the one end thereof To fix the end portion of the tubular spring pin 24 to the bearing plate portion 23b of the second bracket 24, the end portion of the tubular spring pin 24 is inserted into the non-circular bearing hole 23c until the two radial projections 23d are engaged in the two cuts 24a, respectively, and then the end portion projected out of the bearing hole 23c is riveted. Thus, the one end of the tubular spring pin 24 is fixed non-rotatably to the second bracket 23.

The spring pin 24 has also an expanding slot 24b formed therein axially from one of the cuts 24a. So, when the spring pin 24 is tempered, it is made so elastic as to be shrinkable and expansible circumferentially. Thus, the spring pin 24 is radially elastic.

As shown in FIG. 15, the spring pin 24 is press-fitted from the opposite side of the first bracket 21 to the tubular cylinder 22 into the friction torque generating hole 22a of the tubular cylinder 22. When the second bracket 23 is rotated, there will take place a rolling friction between the outer surface of the spring pin 24 and the wall surface of the friction torque generating hole 22a of the cylinder 22 to generate a friction torque. A lubricant (not shown) such as SUMI-COAT (registered trademark) is provided between the outer surface of the spring pin 24 and the wall surface of the friction torque generating bore 22a of the cylinder 22. To retain the lubricant, a concavity or hole (not shown) may be formed in any one or both of the outer surface of the spring pin 24 and wall surface of the friction torque generating bore 22a of the cylinder 22.

Note that the present invention is not limited to the embodiments having been described in the foregoing but can be embodied in any other forms. For example, all the aforementioned spring pins have each an expanding slot, but they may not be provided with such an expanding slot if they are circumferentially elastic. Also, the aforementioned cylinders are each a simple cylinder, but they may be provided each with an expanding slot to be elastic. In this case, the cylinder may be sheathed with a protective cylinder to prevent the lubricant from leaking from the expanding slot or dust from coming in from the expanding slot. The expanding slot may be a spiral one in both the spring pin and cylinder.

What is claimed is:

1. A tilting hinge comprising:

a first bracket consisting of a fixing plate portion and a bearing plate portion bent at a right angle relative to the fixing plate portion, the fixing plate portion being fixed to the body of an apparatus or a component part installed pivotably to the apparatus body, and the bearing plate portion having a non-circular bearing hole formed therein;

a cylindrical member having a fixing portion formed at one end thereof and a friction torque generating through-hole formed axially therein, the fixing end portion being inserted and fixed in the non-circular bearing hole in the bearing plate portion of the first bracket;

a second bracket consisting of a fixing plate portion and a bearing plate portion bent at a right angle relative to the fixing plate portion, the fixing plate portion being fixed to the pivotable component part or apparatus body and the bearing plate portion having a non-circular bearing hole formed therein; and a radially-elastic spring pin having provided at one end thereof a fixing end portion which is inserted and fixed in the non-circular bearing hole in the bearing plate portion of the second bracket;

the spring pin being press-fitted first at the free end thereof into the friction torque generating hole in the cylindrical member, to be rotatable with a friction with the wall surface of the friction torque generating hole in the cyclindrical member.

2. A tilting hinge comprising:

a first bracket consisting of a fixing plate portion and a bearing plate portion bent at a right angle relative to the fixing plate portion, the bearing plate portion having a non-circular bearing hole formed therein and being fixed to the body of an apparatus or a component part installed pivotably to the apparatus body;

a tubular cylindrical member inserted and fixed at one end thereof in the non-circular bearing hole in the bearing plate portion of the first bracket and having formed axially therein a friction torque generating bore;

a second bracket consisting of a fixing plate portion and a bearing plate portion bent at a right angle relative to the fixing plate portion, the bearing plate portion having a non-circular bearing hole formed therein and being fixed to the component part or apparatus body; and a radially-elastic spring pin fixed at one end thereof in the non-circular bearing hole in the bearing plate portion of the second bracket;

the spring pin being press-fitted first at the free end thereof from the free end of the cylindrical member into the friction torque generating bore in the cylindrical to be rotatable with a friction with the wall surface of the friction torque generating bore, and a stopper means being provided between the cylindrical member and the second bracket.

3. The tilting hinge as set forth in claim 2 wherein the stopper means is a stop plate provided at an end of the cylindrical member and abutting the second bracket at a predetermined angle of rotation.

4. The tilting hinge as set forth in any one of claims 1 to 2 wherein the spring pin has a single expanding slot or a plurality of expanding slots formed axially therein.

5. The tilting hinge as set forth in any one of claims 1 to 2 wherein a lubricant is provided between the spring pin and cylindrical member.

6. The tilting hinge as set forth in claim 4, wherein the cylindrical member is sheathed.

7. The tilting hinge as set forth in claim 5, wherein there is formed in any one or both of the outer surface of the spring pin or inner wall of the cylindrical member a concavity or hole in which the lubricant is retained.

* * * * *